(12) United States Patent
Kuroda

(10) Patent No.: US 7,677,739 B2
(45) Date of Patent: Mar. 16, 2010

(54) PROJECTOR

(75) Inventor: Akitoshi Kuroda, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 598 days.

(21) Appl. No.: 11/708,931

(22) Filed: Feb. 21, 2007

(65) Prior Publication Data

US 2007/0206163 A1 Sep. 6, 2007

(30) Foreign Application Priority Data

Mar. 3, 2006 (JP) ............................. 2006-058645

(51) Int. Cl.
*G03B 21/14* (2006.01)
*G02B 23/16* (2006.01)

(52) U.S. Cl. .......................... 353/88; 353/97; 353/119; 359/511

(58) Field of Classification Search .................. 353/88, 353/97, 101, 119; 396/419, 439, 448; 359/511; 348/373–376

See application file for complete search history.

(56) References Cited

U.S. PATENT DOCUMENTS 7,264,362 B2 * 9/2007 Clark et al. ................. 353/119

FOREIGN PATENT DOCUMENTS

JP 11-316416 A 11/1999
JP 2001-249402 A 9/2001

* cited by examiner

*Primary Examiner*—Georgia Y Epps
*Assistant Examiner*—Danell L Owens
(74) *Attorney, Agent, or Firm*—AdvantEdge Law Group, LLC

(57) ABSTRACT

A projector includes a lens cover which is slidable relative to a chassis for covering and exposing a projection aperture of a projection lens. A detecting section includes a light emitting portion which projects a light beam and detects the opened state or closed state of the lens cover depending on the absence or presence of the light beam received by a light receiving portion. The light emitting portion and light receiving portion are disposed so that the optical path of the light beam projected from the light emitting portion and received by the light receiving portion intersects the slide direction of the lens cover. A light shielding portion is provided in the lens cover. The light shielding portion is formed in a predetermined width in the slide direction of the lens cover.

7 Claims, 10 Drawing Sheets

PROJECTOR

BACKGROUND

1. Technical Field

The present invention relates to a projector which includes a light source, a light modulating device for forming a light image by modulating a light beam projected from the light source in response to image information, a projection lens for projecting the formed light image, and a chassis housing the light source, the light modulating device, and the projection lens therein.

2. Related Art

In the past, there was widely used a projector which includes a light source, a light modulating device for forming a light image by modulating a light beam projected from the light source in response to image information, and a projection lens for projecting the formed light image. Such a projector can extensively project the light image formed by the light modulating device on a screen, etc. through the projection lens.

Herein, the projection lens may be easily damaged. Accordingly, it is necessary to protect the projection lens when the projector is not used. There is widely used a projector provided in a chassis housing the device body therein so as to slidably move a lens cover for protecting the projection lens (for example, see JP-A-2001-249402). The projection lens is covered and protected by sliding the lens cover in one direction along the chassis in the projector disclosed in JP-A-2001-249402. In addition, the projection lens is exposed by sliding the lens cover in another direction. Therefore, it becomes possible to project the light beam as the light image through the projection lens. Two switches are provided in the device body of the lens cover and the opened/closed state of the lens cover is detected by the switches.

Specifically, the two switches are formed of detector switches. One switch is provided adjacent to a projection lens and the other switch is provided away from the projection lens rather than the one switch in the slide direction of the lens cover. It is possible to detect an opened state, a standby state (state when the lens cover covers a part of the projection lens), and a closed state of the lens cover by detecting the on/off state of the switches. In the projector disclosed in JP-A-2001-249402, an emitted light amount of a light source and the number of rotations of a cooling fan are controlled depending on the opened/closed state of the lens cover.

However, in a projector disclosed in JP-A-2001-249402, when a lens cover is slightly shifted from a closed state, a switch disposed away from a projection lens is turned off by a slide movement of the lens cover. Accordingly, even when the projection lens is not covered with the lens cover, there is a problem that it is determined that the lens cover is in a standby state. Accordingly, since the amount of light emitted from the light source decreases and the number of rotations of the cooling fan decreases due to the slight movement of the lens cover, the operation of a projector is not stabilized. Assumed that a switch for detecting the opened/closed state of the lens cover is formed of a pressing switch such as a detector switch, the on/off state of the switch is mechanically switched with the slide movement of the lens cover. Accordingly, the switch state is not recovered, thereby lowering the reliability at the time of detecting the opened/closed state of the lens cover.

SUMMARY

An advantage of some aspects of the invention is to provide a projector capable of properly detecting the opened/closed state a lens cover.

According to an aspect of the invention, there is a projector including a light source; a light modulating device that forms a light image by modulating a light beam projected from the light source in response to image information; a projection lens that projects the formed light image; and a chassis that houses the light source, the light modulating device, and the projection lens therein, wherein the chassis including a lens cover which is provided to be slidable relative to the chassis and which covers a projection aperture of the projection lens by sliding in one direction and exposing the projection aperture by sliding in the opposite direction, a detecting section including a light emitting portion which projects the light beam, and a light receiving portion that receives the light beam projected from the light emitting portion, the detecting section detects the opened state or the closed state of the lens cover depending on the absence or presence of the light beam received by the light receiving portion, and the light emitting portion and the light receiving portion are disposed so that the optical path of the light beam projected from the light emitting portion and inputted to the light receiving portion intersects a slide direction of the lens cover, and a light shielding portion shielding the light beam inputted from the light emitting portion to the light receiving portion is provided in the lens cover, and the light shielding portion is formed in a predetermined width in the slide direction of the lens cover. Herein, the opened state of the lens cover represents the state of the lens cover when the projection aperture of the projection lens is not covered with the lens cover. The closed state of the lens cover represents the state of the lens cover when at least a part of the projection aperture of the projection lens is covered with the lens cover. The predetermined width of the shielding portion may be set to a width size to shield the light beam inputted to the light receiving portion of the detecting section until a state where the lens cover completely exposes the projection aperture of the projection lens from a state where the lens cover covers a part of the projection aperture by a slide movement. Alternatively, the width of the shielding portion may be set to a width size to shield the light beam inputted to the light receiving portion until a state where the lens cover exposes a part of the projection aperture of the projection lens from a state where the lens cover completely covers the projection aperture of the projection lens by a slide movement.

In this case, the shielding portion of the lens cover sliding relative to the chassis is formed in a predetermined width in the slide direction of the lens cover. Accordingly, even when the lens cover slides not to cover the projection lens, it is possible to detect the opened state of the lens cover.

That is, the shielding portion is interposed between the light emitting portion and the light receiving portion of the detecting section that detects the opened/closed sate of the lens cover and shields the light beam projected from the light emitting portion and projected to the light receiving portion. Then, the shielding portion is formed in a predetermined width in the slide direction of the lens cover. Accordingly, even when the lens cover moves a little so as not to cover or expose a part of the projection aperture of the projection lens from the opened state or the closed state, the shielding portion shields the light beam inputted to the light receiving portion. Therefore, it is possible to allow the lens cover to move a little. Accordingly, since it is possible to allow the lens cover to move so as not to cover or expose a part of the projection aperture of the projection lens, the detecting section can properly detect the opened state or the closed state of the lens cover.

The detecting section includes a light emitting portion projecting the light beam and a light receiving portion receiving the light beam projected from the light emitting portion and detects the opened and closed states of the lens cover by considering whether or not the light receiving portion receives the light beam. Accordingly, the detecting section can prevent a false detection of a position of the lens cover caused due to a defect of a micro switch when the detecting section is formed of the micro switch which is mechanically turned on and off. Therefore, it is possible to securely and properly perform the detection of the lens cover.

It is preferable that the projector further includes a state determining portion which is connected to the detecting section and which determines the opened state or the closed state of the lens cover by acquiring the opened state or the closed state of the lens cover from the detecting section; and an image formation controlling portion which forms a black image in the light modulating device when the state determining portion determines that the lens cover is in the closed state.

In this case, the image formation controlling portion forms the black image in the light modulating device when the state determining portion determines that the lens cover is in the closed state and covers at least a part of the projection aperture of the projection lens. Accordingly, it is possible to reduce the emitted light amount of the light beam projected from the projection lens. For this reason, it is possible to suppress the rise in temperature of the lens cover to which at least a part of the light beam projected from the projection lens is radiated in comparison with a case where the light beam as the generally formed image is radiated. Accordingly, it is possible to suppress the heat generation of the lens cover.

It is preferable that the image formation controlling portion forms a light image based on image information in the light modulating device when the state determining portion determines that the lens cover is switched from the closed state to the opened state.

In this case, when the lens cover is switched from the closed state to the opened state and the projection aperture of the projection lens is completely exposed, the image formation controlling portion can switch the image formed by the light modulating device to the image based on the image information. Accordingly, it is possible to easily restore the projector to the general driving state.

It is preferable that the projector further includes a state determining portion which is connected to the detecting section and which determines the opened state or the closed state of the lens cover by acquiring the opened state or the closed state of the lens cover from the detecting section; and a light source drive controlling portion which reduces the amount of light emitted from the light source when the state determining portion determines that the lens cover is in the closed state.

In this case, when the state determining portion determines that the lens cover is in the closed state and at least a part of the projection aperture of the projection lens is covered with the lens cover, the light source drive controlling portion reduces the amount of light emitted from the light source. Accordingly, since the light amount of the light beam projected to the lens cover from the projection lens decreases, it is possible to reduce the heat generation of the lens cover in comparison with the case where the light beam as the light image at the general driving operation is projected to the lens cover. Therefore, it is possible to suppress the rise in temperature of the lens cover.

It is preferable that the projector further includes a storing section that stores the amount of light emitted from the light source; and an emitted light amount storing portion that stores the amount of light emitted from the light source when the lens cover is in the opened state, wherein the light source drive controlling portion lights up the light source in the amount of light stored in the storing section by the emitted light amount storing portion when the state determining portion determines that the lens cover is switched from the closed state to the opened state.

In this case, the emitted light amount storing portion stores the amount of light emitted from the light source when the lens cover is in the opened state in the storing section and the state determining portion determines that the lens cover is switched from the closed state to the opened state, the light source drive controlling portion acquires the emitted light amount when the lens cover is in the opened state, which is stored in the storing section and lights up the light source in the emitted light amount. Accordingly, the user does not need to reset the emitted light amount. Therefore, it is possible to easily return the state of the light source at the time of the general driving operation of the projector.

It is preferable that the projector further includes a protruding member abutting on the lens cover and an biasing member biasing the protruding member in one direction relative to the lens cover are provided on a surface of the chassis opposed to the lens cover; and slope portions which abut on the protruding member and are symmetrical about substantially the center of a slide range of the lens cover are provided along the slide direction of the lens cover, and wherein the slope portions move the protruding member in a direction where an biasing force increases by the biasing member by positioning the protruding member in the center of the slide range with the sliding operation of the lens cover.

In this case, the protruding member biasing in a direction pressed relative to the lens cover by the biasing member abuts on the slope portion provided in the lens cover. The slope portion is symmetrical about the center of the slide range of the lens cover and the protruding member is positioned about the center of the slope portion, that is, the lens cover is positioned substantially in the center of the slide range. Therefore, the biasing force increases by the biasing member, whereby a force with which the protruding member presses the slope portion becomes stronger.

Accordingly, since the moving force required for moving the lens cover is the smallest in the end of the slide range of the lens cover and the moving force is the largest substantially in the center of the slide range of the lens cover, it is possible to easily keep the position of the lens cover in the end of the slide range. Accordingly, it is possible to easily keep the projection aperture of the projection lens in the completely exposed state or the coated state.

Assumed that the lens cover exceeds substantially a half of the slide range of the lens cover with the slide movement of the lens cover, the biasing force added to the protruding member by the biasing member decreases. Therefore, it is possible to reduce the moving force of the lens cover. Accordingly, it is possible to improve the operability of the lens cover and know the position of the lens cover with the variation in moving force.

It is preferable that the projector further includes a step portion into which the protruding member is fitted is provided on both sides of the slope portion.

In this case, the step portion is formed on both sides of the slope portion and the protruding member is fitted into the step portion, thereby causing click feeling in the end of the slide range of the lens cover. Accordingly, it is possible to easily recognize that the lens cover is positioned in the end of the slide range with the click feeling. The protruding member is fitted into the step portion, whereby the lens cover is latched to the end of the slide range. Therefore, it is possible to prevent the lens cover from suddenly moving from the end of the slide range. Accordingly, it is possible to further improve the operability of the lens cover and more easily keep the projection aperture of the projection lens in the completely exposed state or the coated state.

BRIEF DESCRIPTION OF THE DRAWINGS

Hereinafter, the invention will be described with reference to the accompanying drawings, wherein like numbers reference like elements.

DESCRIPTION OF EXEMPLARY EMBODIMENTS

Next, exemplary embodiments of the invention will be described with reference to the drawings.

1. General Configuration of Projector 1

Figure 1:
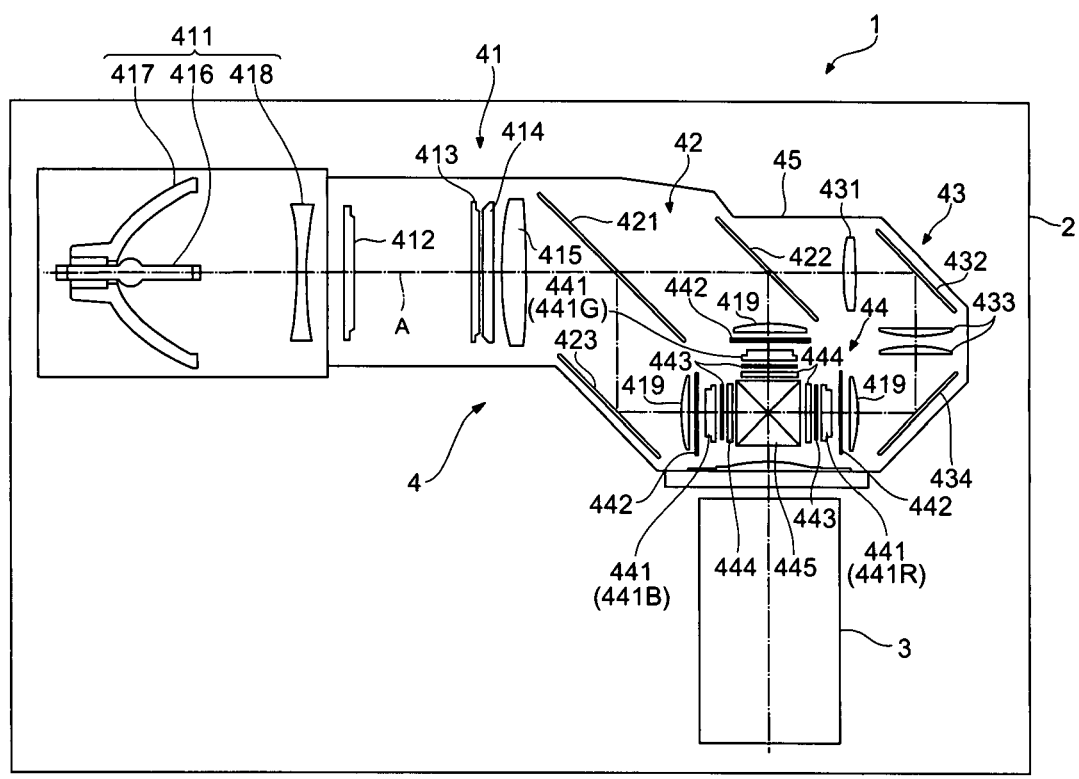
FIG. 1 is a schematic view illustrating a configuration of a projector according to an embodiment of the invention.

FIG. 1 is illustrating the configuration of a projector 1 according to an embodiment of the invention.

The projector 1 forms a light image by modulating a light beam projected from a light source lamp 416 in response to image information and projects the light image to a screen, etc. through a projection lens 3. As show in FIG. 1, the projector 1 includes an exterior chassis 2, a projection lens 3, and an optical unit 4.

Although not shown in FIG. 1, in an exterior chassis 2, a cooling unit formed of a cooling fan for cooling the interior portion of the projector 1, a power supply unit for supplying a power to constitutional members in the interior portion of the projector 1, and a control unit 5 (see FIG. 9) for controlling the entire projector 1 are disposed in a space except for the projection lens 3 and the optical unit 4. The exterior chassis 2 and the control unit 5 will be specifically described later.

The projection lens 3 extensively projects the light image (color image) formed in the optical unit 4 described later to a screen not shown in FIG. 1. The projection lens 3 is formed of a set of lenses where a plurality of lenses are housed in a cylindrical lens tube.

2. Configuration of Optical Unit 4

The optical unit 4 forms the light image (color image) corresponding to image information by optically treating the light beam projected from the light source under a control performed by the control unit. The optical unit 4 extends along the rear surface of the exterior chassis 2 and has a substantially L shape in a plan view extending along a side surface of the exterior chassis 2.

As shown in FIG. 1, the optical unit 4 includes an illumination optical device 41, a color separation optical device 42, a relay optical device 43, an electro-optical device 44, and an optical part chassis 45 for housing the optical parts 41 to 44 therein and for supporting and fixing the projection lens 3 in a predetermined position.

The illumination optical device 41 is an optical system for substantially evenly illuminating an image forming region of a liquid crystal panel described below constituting the electro-optical device 44. The illumination optical device 41 includes a light source device 411, a first lens array 412, a second lens array 413, a polarization converter 414, and a superimposing lens 415.

The light source device 411 includes a light source lamp 416 for projecting a radial light ray, a reflector 417 for reflecting a radiated light beam projected from the light source lamp 416 and focusing the light beam on a predetermined position, and a parallelizing concave lens 418 for parallelizing the light beam focused in the reflector 417 to an illuminated light axis A. The light source lamp 416 includes a halogen lamp, a metal halide lamp, or a high-pressure mercury lamp. The reflector 417 includes an ellipsoid reflector having a rotation ellipsoidal surface. However, the reflector 417 may include a paraboloid reflector having a rotation paraboloidal surface. In this case, the parallelizing concave lens 418 may be omitted.

A first lens array 412 includes small lenses which have a substantially rectangular outline as viewed from an optical axis direction and are arranged in a matrix. Each small lens divides the light beam projected from the light source device 411 into a plurality of partial light beams.

A second lens array 413 has the same configuration as the first lens array 412 and includes the small lenses arranged in the matrix. The second lens array 413 focuses an image of each small lens of the first lens array 412 on the image forming region of the liquid crystal panel 441 described below in the electro-optical device 44 with the superimposing lens 415.

The polarization converter 414 is disposed between the second lens array 413 and the superimposing lens 415 and converts a light beam from the second lens array 413 to approximately one kind of polarized light beam. Specifically, each partial light beam converted to approximately one kind of linearly-polarized light beam by the polarization converter 414 is substantially superimposed on the image forming region of the liquid crystal panel 441 described below in the electro-optical device 44 finally by the superimposing lens 415. Since only one kind of polarization light beam can be used in the projector 1 in which a liquid crystal panel modulating the polarization light beam is used, approximately a half of the light beam from the light source device 411 which randomly emits the polarization light beam cannot be used. Accordingly, the light beam projected from the light source device 411 is converted to approximately one kind of linearly-polarized light beam by using the polarization converter 414 so as to improve the use efficiency of the light beam in the electro-optical device 44.

The color separation optical device 42 includes two sheets of dichroic mirrors 421 and 422, and a reflecting mirror 423. The color separation optical device 42 separates a plurality of partial light beams projected from the illumination optical device 41 by the dichroic mirrors 421 and 422 into color lights having three colors of red, green, and blue. The relay optical device 43 includes an incident lens 431, a relay lens 433, and reflecting mirrors 432 and 434, and conducts color light beams separated in the color separation optical device 42 to a liquid crystal panel 441R for a red light beam.

Then, in the diachronic mirror 421 of the color separation optical device 42, a red light beam component and a green light beam component projected from the illumination optical device 41 are penetrated and a blue light beam component is reflected. The blue light beam reflected by the dichroic mirror 421 is reflected on the reflecting mirror 423, and the blue light beam penetrates through a field lens 419 into a liquid crystal panel 441B for the blue light beam. The field lens 419 converts each partial light beam projected from the second lens array 413 to the light beam parallel to a central axis (chief light ray). The field lens 419 provided on the light incident side of another liquid crystal panels 441G and 441R for green light beam and red light beam also operates as described above.

The green light beam among the red light beam and the green light beam penetrating through the dichroic mirror 421 is reflected by the dichroic mirror 422, and the green light beam penetrates through the field lens 419 into the liquid crystal panel 441G for the green light beam. Meanwhile, the red light beam penetrates the dichroic mirror 422, passes through the relay optical device 43 and the field lens 419, and reaches the liquid crystal panel 441R for the red light beam. The optical path of the red light beam is longer than the optical paths of other color light beams, thereby preventing the use efficiency of the light beam caused by light diffusion from being reduced. Accordingly, the relay optical device 43 is used for the red light beam. That is, a partial light beam inputted in the incident lens 431 is transmitted to the field lens 419 as it is. Although the configuration for penetrating the red light beam out of three color light beams exemplified in the relay optical device 43, the invention is not limited to the configuration, but may have the configuration for penetrating, for example, the blue light beam.

The electro-optical device 44 forms the light image (color image) by modulating three color light beams projected from the light separation optical device 42 depending on the image information and synthesizing the color light beams. The electro-optical device 44 includes three liquid crystal panels 441 (reference numeral 441R denotes the liquid crystal panel for the red light beam, reference numeral 441G denotes the liquid crystal panel for the green light beam, and reference numeral 441B denotes the liquid crystal panel for the blue light beam) as the light modulating device, three corresponding polarization plates 442 on the incident sides disposed on the light beam incident side of the liquid crystal panels 441, three viewing angle compensating plates 443 disposed on the light beam emitting side of the liquid crystal panels 441, three polarization plate 444 on the emitting side disposed on the light beam emitting side of the three viewing angle compensating plates 443, and a dichroic prism 445 as a color synthesizing optical device.

The color lights of which polarization direction is adjusted substantially in one direction by the polarization converter 414 are inputted to the polarization plate 442 on the incident side. The polarization plate 442 on the incident side penetrates the only polarization light beam adjusted substantially parallel to the polarization axis of the light beam by the polarization converter 414 out of the inputted light beams and absorbs the other light beams. For example, the polarization plate 442 on the incident side has the configuration that a polarization film is attached to a translucent substrate such as sapphire glass or quartz.

In the liquid crystal panel 441 (441R, 441G, and 441B) as the light modulating device which is not specifically shown, a pair of transparent glass substrates are filled and sealed with liquid crystals which are the electro-optical material. The inclination state of the liquid crystals is controlled and a polarization direction of the polarized light beam projected from the polarization plate 442 on the incident side is modulated in response to a diving signal from the control unit.

The viewing angle compensating plate 443 having a film shape compensates a phase difference caused between ordinary light and extraordinary light due to a double refraction caused in the liquid crystal panel 441 when the light beam is obliquely inputted to the liquid crystal panel 441 (inputted on a slant to a normal line direction of the light beam incident surface of the liquid crystal panel 441). The viewing angle compensating plate 443 is an optical anisotropic body having negative uniaxial anisotropy. The optical axis is directed in a predetermined direction in a film surface and is inclined to slope at a predetermined angle in an out-of-surface direction from the film surface.

Since a discotic (disc-shaped) compound layer is formed on a transparent support such as triacetyl cellulous (TAC) with an inclination film interposed therebetween, a WV film (manufactured by FUJIFILM Corporation) can be adopted as the viewing angle compensating plate 443.

The polarization plate 444 on the incident side penetrates the only light beam having a polarization axis orthogonal to a penetration axis of the light beam in the polarization plate 442 on the incident side out of the light beams projected from the liquid crystal panel 441 through the viewing angle compensating plate 443 and absorbs the other light beams.

A cross dichroic prism 445 is the color synthesizing optical device which synthesizes modulation light modulated for each color light projected from the polarization plate 444 on the incident side to form the light image (color image). The cross dichroic prism 445 has a square shape in the plan view formed by bonding four orthogonal prisms and two dielectric multilayer films are formed on an interface formed by bonding the orthogonal prisms. The dielectric multilayer films penetrate the color light through the polarization plate 444 on the incident side disposed on a side (G color light side) opposite to the projection lens 3 and reflect the color light through the rest two polarization plates 444 on the incident side (an R color light side and a B color light side). Accordingly, the corresponding color light beams modulated in each polarization plate 442 on the incident side, each liquid crystal panel 441, each viewing angle compensating plate 443, and each polarization plate 444 on the emitting side are synthesized, whereby the color image is formed.

3. Configuration of Exterior Chassis 2

Figure 2:
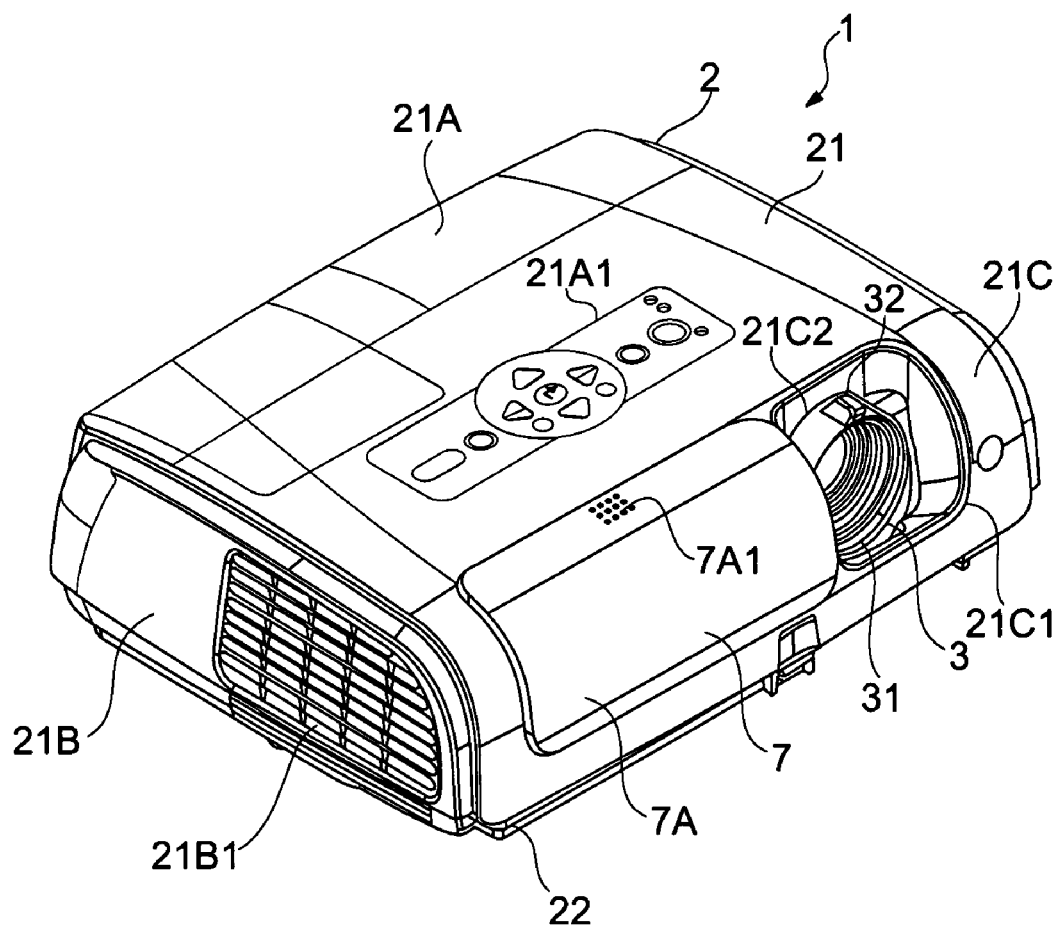
FIG. 2 is a perspective view of a projector in a front view according to an embodiment of the invention.
Figure 3:
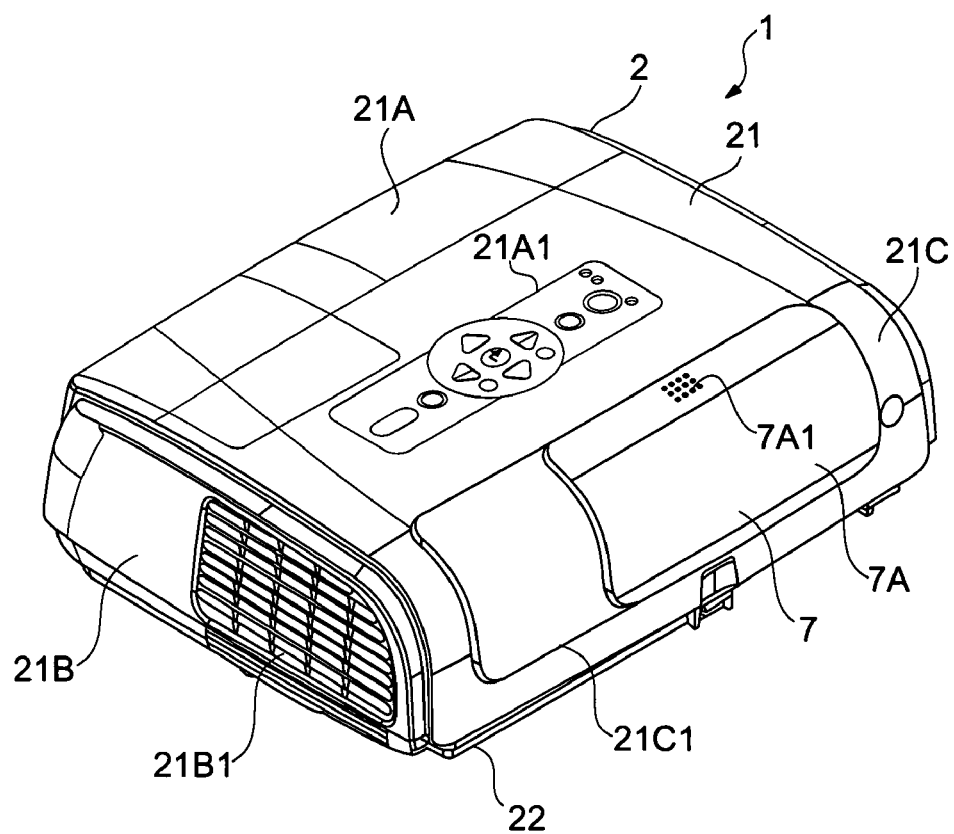
FIG. 3 is a perspective view of a projector in a front view according to an embodiment of the invention.

FIGS. 2 and 3 are perspective views of a projector 1 in a front view. Specifically, FIG. 2 is the perspective view illustrating a state when a projection aperture of the projection lens 3 is completely exposed by opening a lens cover 7 provided in the exterior chassis 2 constituting the projector 1.

FIG. 3 is the perspective view illustrating a state when the projection aperture 31 of the projection lens 3 is completely covered by blocking the lens cover 7.

As described above, the exterior chassis 2 houses the projection lens 3, the optical unit 4, the cooling unit, the power supply unit, and the control unit 5 (see FIG. 9) therein. As shown in FIGS. 2 and 3, the exterior chassis 2 is formed of an upper case 21 constituting the top surface, the front surface, the rear surface, and the side surface of the exterior chassis 2, a lower case 22 constituting the bottom surface, the front surface, the rear surface, and the side surface of the projector 1 and a guide block 23 (see FIGS. 4 to 6 and FIG. 8) mounted on the upper case 21. The upper case 21 and the lower case 22 are fixed to each other with screws. In addition, the upper case 21 and the guide block 23 are fixed to each other with the screws.

An operation panel 21A1 extending along a length direction of the projector 1 is provided substantially in the center of the top surface 21A of the upper case 21. A plurality of keys is placed on the operation panel 21A1. For example, the keys include a power key for switching the on/off state of the power of the projector 1, a menu key for displaying various menu screens, and a setup key for setting up an operation or a zoom on the menu screens.

An exhaust port 21B1 for exhausting cooling air used for various electronic parts housed in the exterior chassis 2 is formed on the left surface 21B (left side surface shown in FIGS. 2 and 3) of the upper case 21. A cooling fan for forcibly exhausting air used for cooling the interior portion of the exterior chassis 2, which is not shown, is provided in the exhaust port 21B1.

A concave portion 21C1 immerged into the interior side of the upper case 21 substantially on the entirety of the front surface 21C is formed on the front surface 21C of the upper case 21. An opening 21C2 (shown in FIG. 2) where the projection aperture 31 of the projection lens 3 is exposed is formed in the concave portion 21C1. The lens cover 7 covering the projection aperture 31 of the projection lens 3 exposed from the opening 21C2 is provided in the concave portion 21C1. The lens cover 7 will be specifically described later.

4. Configuration of Guide Block 23

Figure 4:
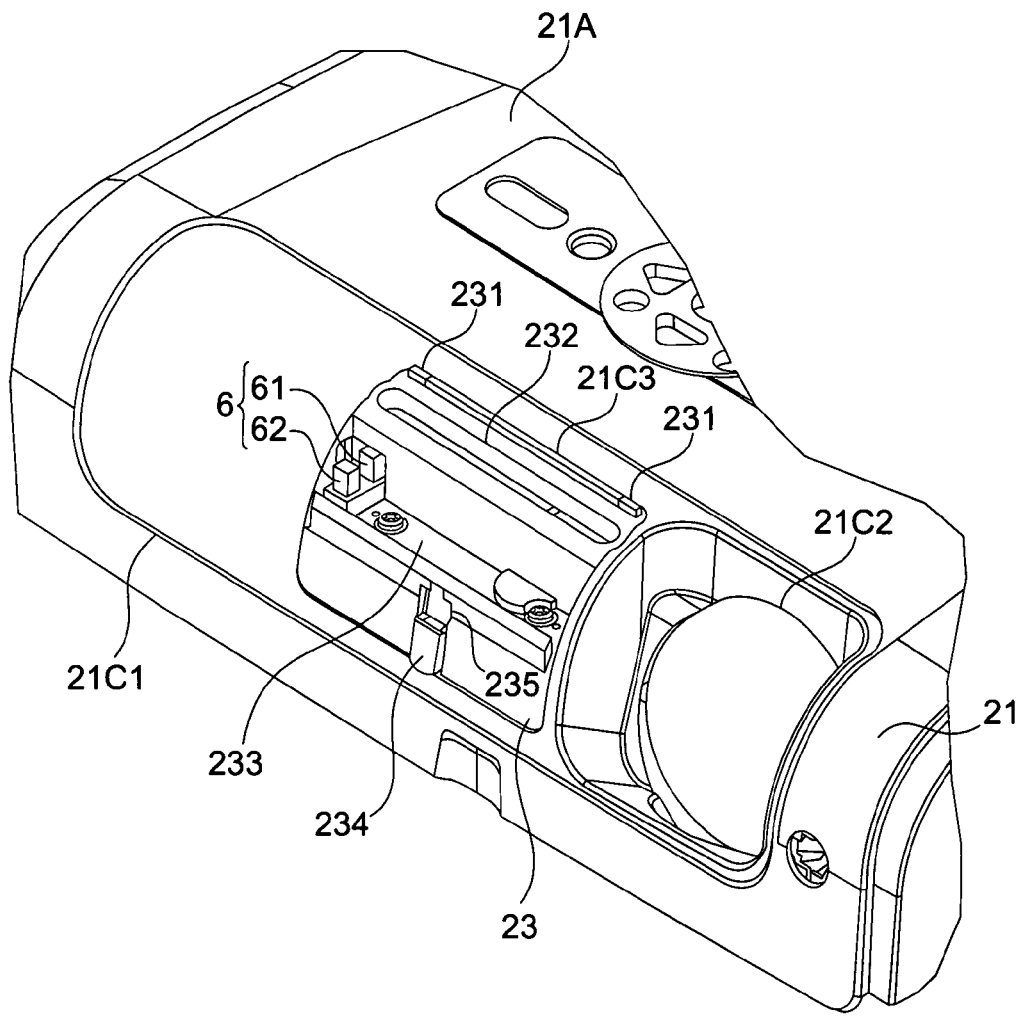
FIG. 4 is a perspective view illustrating a concave portion formed in an upper case according to an embodiment of the invention.

FIG. 4 is an enlarged perspective view of the concave portion 21C1 formed in the upper case 21. The step portion 21C3 not specifically shown, which is immersed to the interior side of the exterior chassis 2 is formed substantially in the center of the concave portion 21C1. As shown in FIG. 4, the guide block 23 for guiding the slide movement of the lens cover 7 described below is provided in the step portion 21C3.

The guide block 23 is formed substantially as large as the external shape of the step portion 21C3 and is mounted to be fitted into the step portion 21C3.

Figure 5:
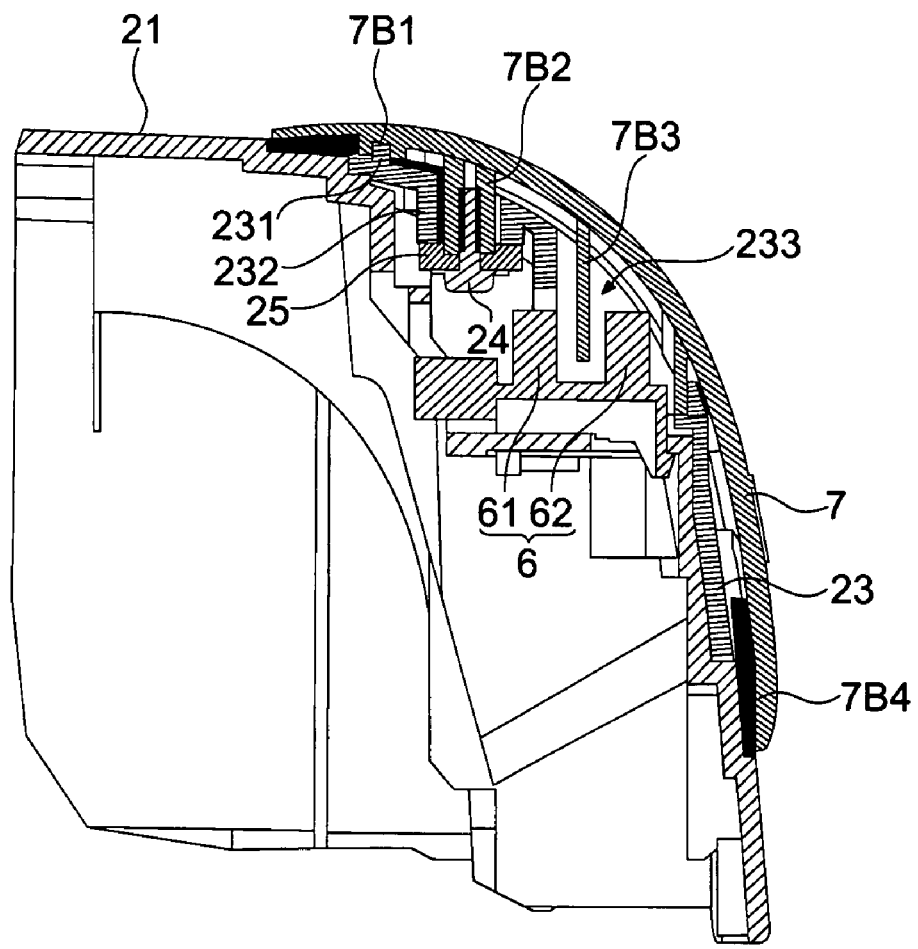
FIG. 5 is a longitudinal cross-sectional view illustrating an upper case, a guide block, and a lens cover according to an embodiment of the invention.
Figure 6:
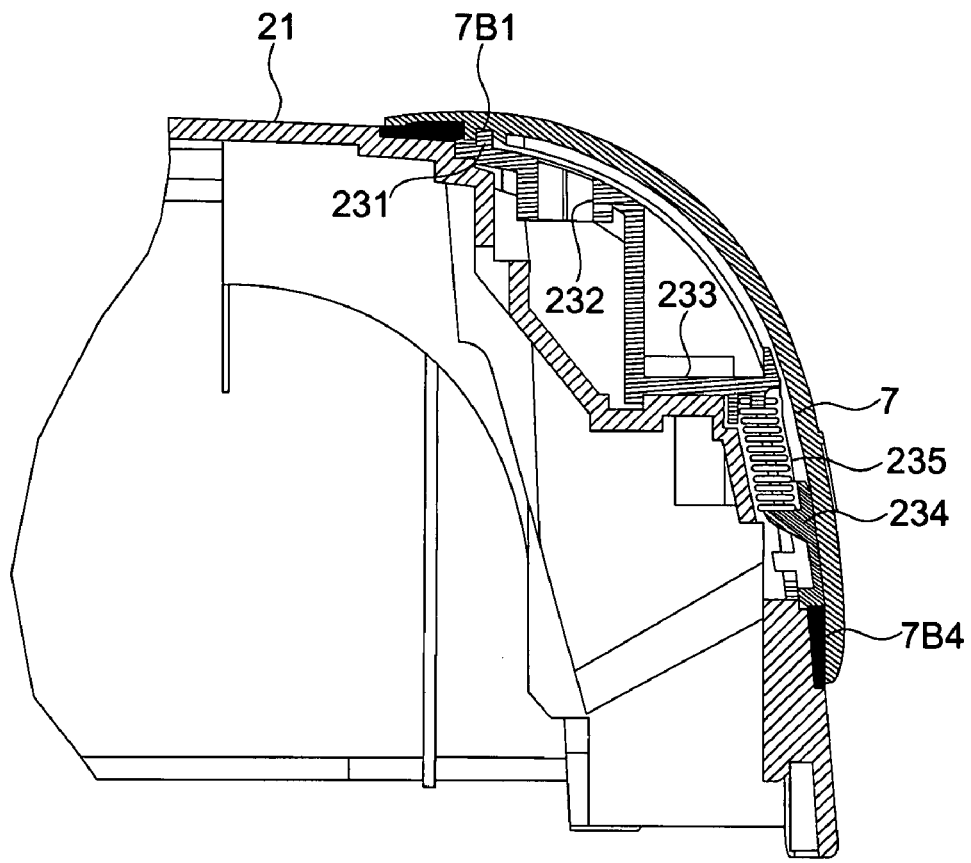
FIG. 6 is a longitudinal cross-sectional view illustrating an upper case, a guide block, and a lens cover according to an embodiment of the invention.

FIGS. 5 and 6 are longitudinal cross-sectional views of the upper case 21, the guide block 23, and the lens cover 7 when the lens cover 7 is mounted and the lens cover 7 is in a closed state. FIG. 5 is a longitudinal cross-sectional view in a position where a detecting section 6 is provided and FIG. 6 is a longitudinal cross-sectional view in a position where a protruding member 234 and an biasing member 235 are provided.

As shown in FIGS. 4 to 6, a protruding streak portion 231 extending in a horizontal direction is formed on both sides in the horizontal direction in the upper portion of the guide block 23. The protruding streak portion 231 is fitted into the concave portion 7B1 (shown in FIGS. 5 and 6) of the lens cover 7 so as to reduce an area where the protruding steak portion 231 is in contact with the lens cover 7. Accordingly, it is possible to decrease a resistance at the time of the slide movement of the lens cover 7.

The protruding portion 7B2 of the lens cover 7 is inserted into the lower side of the protruding streak portion 231 and a substantially elongated guide opening 232 (shown in FIGS. 4 to 6) guiding the horizontal slide movement of the lens cover 7 are formed on the lower side of the protruding streak portion 231 in the guide block 23.

A substantially L-shaped step portion 233 as viewed from a vertical cross section (shown in FIGS. 4 and 6) immerged into the interior side of the upper case 21 is formed on the lower side of the guide opening 232 and the detecting section 6 (shown in FIGS. 4 and 5) for detecting the opened/closed state of the lens cover 7 is provided on the left side (left side shown in FIG. 4) of the step portion 233. The detecting section 6 is electrically connected with the control unit 5 (see FIG. 9) described below and the control unit 5 judges the opened/closed state of the lens cover 7 on the basis of a signal inputted from the detecting section 6.

The detecting section 6 is formed of a photo interrupter and includes a pair of light emitting portion 61 and light receiving portion 62 disposed opposite to each other. The light emitting portion 61 and the light receiving portion 62 are provided opposite to each other in a slide direction of the lens cover 7, that is, in a direction orthogonal to a horizontal direction which is the length direction of the projector 1. More specifically, the light emitting portion 61 and the light receiving portion 62 are disposed opposite to each other so that a line coupling the light emitting portion 61 and the light receiving portion 62 crosses vertically to the slide direction of the lens cover 7.

Accordingly, the direction of the light beam projected from the light emitting portion 61 is substantially orthogonal to the slide direction of the lens cover 7. The detecting section 6 outputs an 'off' signal to the control unit 5 when the light receiving portion 62 receives the light beam projected from the light emitting portion 61 and outputs an 'on' signal to the control unit 5 when the light receiving portion 62 does not receive the light beam.

There are provided the protruding member 234 (shown in FIGS. 4 and 6) abutting on a slope portion of the lens cover 7 described below and the biasing member 235 (shown in FIGS. 4 and 6) applying an biasing force to the lower side of the protruding member 234 (shown in FIGS. 4 and 6) on the lower side of the step portion 233 in the guide block 23.

The protruding member 234 is provided so as to be slidable vertically to the guide block 23. The protruding member 234 of which the lower side has an arcuate shape slides vertically along a slope portion 7B4 of the lens cover 7 with the slide movement of the lens cover 7 and abuts on the step portion 7B5 described below at the end in a slide range of the lens cover 7.

The biasing member 235 is formed of a compression spring. In the biasing member 235, one end portion is mounted on the upper case 21 and the other end portion is mounted on the top portion of the protruding member 234. The protruding member 234 presses the slope portion 7B4 and the step portion 7B5 of the lens cover 7 by the biasing member 235 and the protruding member 234 moves up and down while applying a downward biasing force to the slope portion 7B4 and the step portion 7B5 of the lens cover 7.

5. Configuration of Lens Cover 7

The lens cover 7 exposes the projection aperture 31 of the projection lens 3 when the projector 1 is used and protects the projection lens 3 by covering the projection aperture 31 when the projector is not used. As shown in FIGS. 2 and 3, the lens cover 7 has a substantially arcuate-shaped curved surface shape as viewed from a cross section to coincide with the shape of the front 21C of the upper case 21 and is provided to be slidable horizontally along the front surface 21C of the upper case 21. The horizontal size of the lens cover 7 is smaller than that of the concave 21C1 formed in the upper case 21 by approximately ⅔. By this configuration, it is possible to cover an operating portion 32 for adjusting a zoom or a focus of the projection lens 3 when the lens cover 7 is closed. Accordingly, it is possible to prevent the operating portion 32 from being mistakenly operated when the lens cover 7 is closed. The height wise size of the lens cover 7 is substantially as same as that of the concave portion 21C1. A nonslip portion 7A1 having a plurality of protrusions is provided substantially in the center of the top portion of the front surface 7A in the lens cover 7, whereby the user can easily perform the slide movement of the lens cover 7.

Figure 7:
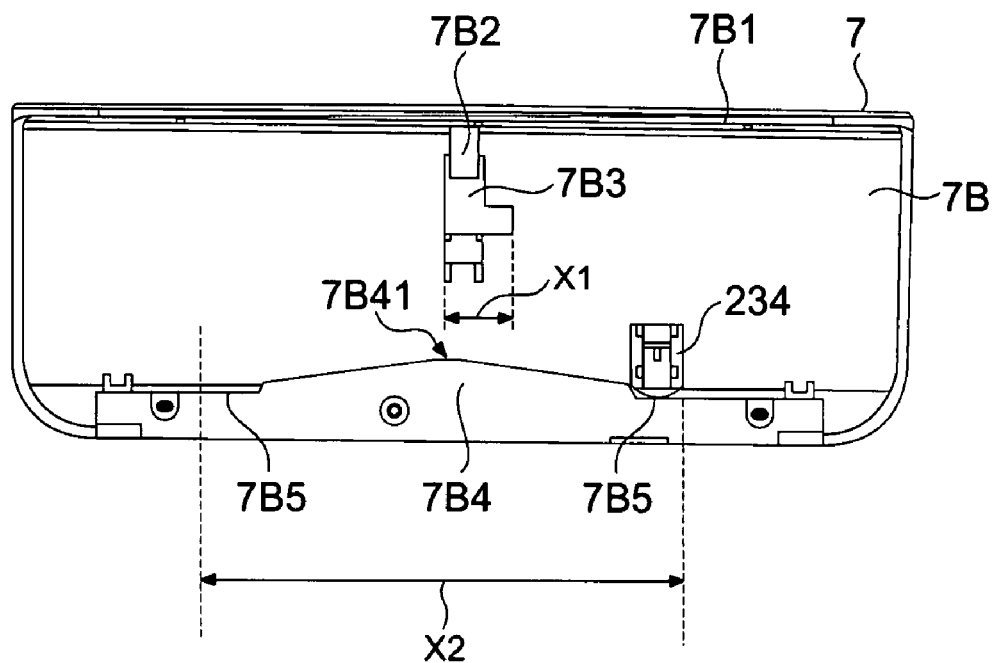
FIG. 7 is a rear view illustrating a lens cover according to an embodiment of the invention.
Figure 8:
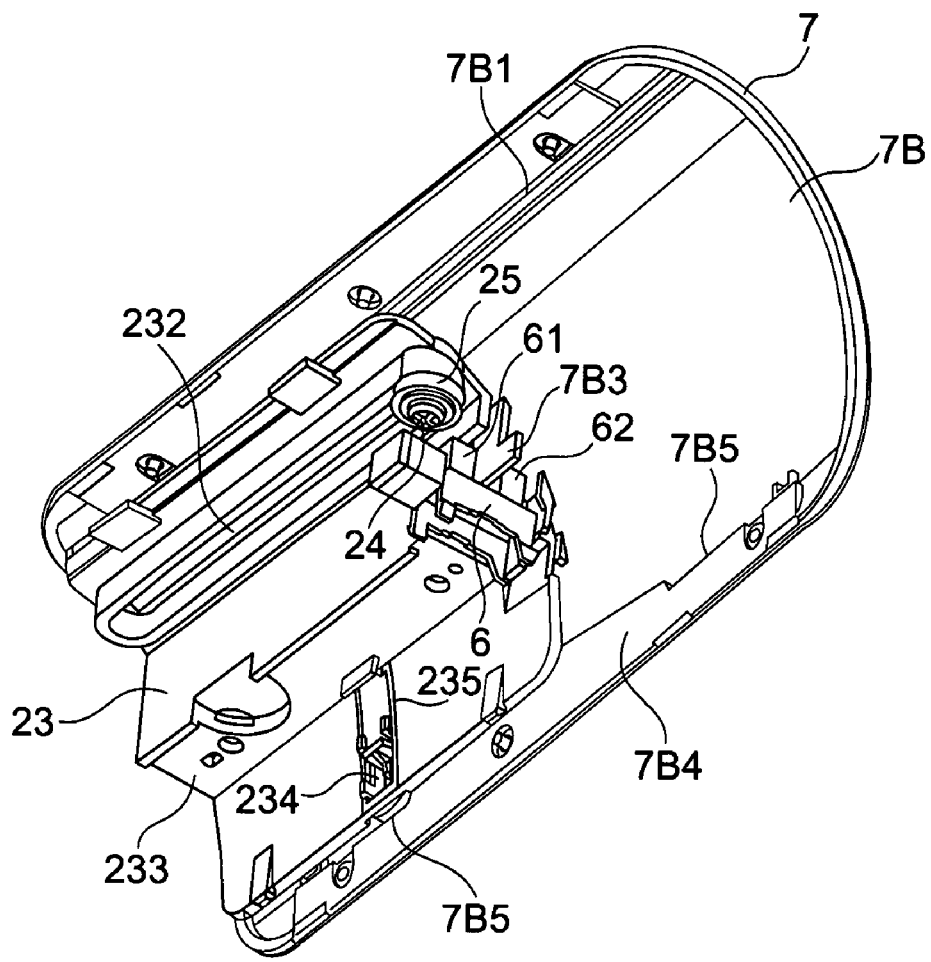
FIG. 8 is a perspective view of a guide block and a lens cover in a rear view according to an embodiment of the invention.

FIG. 7 illustrates the lens cover 7 in a rear view, that is, in an opposite view to the upper case 21. FIG. 8 is a perspective view of the lens cover 7 and the guide block 23 in a rear view when the lens cover 7 is mounted on the guide block 23.

As shown in FIGS. 5 to 8, the concave portion 7B1 is formed adjacent to the upper end on the rear surface 7B of the lens cover 7 along the slide movement direction of the lens cover 7. The protruding streak portion 231 (shown in FIGS. 5 and 6) formed in the guide block 23 described above is fitted into the concave 7B1. Accordingly, the protruding streak portion 231 guides the slide movement of the lens cover 7 and reduces a resistance at the time of the slide movement.

The protruding portion 7B2 (shown in FIGS. 5 and 7) inserted into the guide opening 232 formed in the guide block 23 is provided substantially in the lower center of the concave portion 7B1 on the rear surface 7B. Screw openings are formed in the interior side of the protruding portion 7B2. When the protruding portion 7B2 is inserted into the guide opening 232, a screw 24 (shown in FIGS. 5 and 8) for mounting the lens cover 7 on the guide block 23 is threaded with a washer 25 (shown in FIGS. 5 and 8) having a dimension larger than a dimension in a short side direction of the guide opening 232.

A shielding portion 7B3 (shown in FIGS. 5, 7, and 8) is formed on the lower side of the protruding portion 7B2. The shielding portion 7B3 is interposed between the light emitting portion 61 and the light receiving portion 62 of the detecting section 6 and shields the light beam projected from the light emitting portion 61 and projected to the light receiving portion 62 with the slide movement of the lens cover 7.

More specifically, the shielding portion 7B3 is interposed between the light emitting portion 61 and the light receiving portion 62 when the lens cover 7 is in an opened state, that is, a state when the projection lens 3 is completely exposed from the opening 21C2 formed in the concave portion 21C1 of the upper case 21.

As described below, that the lens cover 7 is in the opened state indicates the state of the lens cover 7 when the projection aperture 31 of the projection lens 3 is not covered with the lens cover 7 and the projection aperture 31 is completely exposed. That the lens cover 7 is in the closed state indicates the state of the lens cover 7 when at least a part of the projection aperture 31 of the projection lens 3 is covered with the lens cover 7.

The shielding portion 7B3 has a substantially L shape. The width size (horizontal size) of the shielding portion 7B3 is set to a size X1 (shown in FIG. 7). The size X1 is interposed between the light emitting portion 61 and the light receiving portion 62 even when the lens cover 7 slides so that the lens cover 7 does not cover a part of the projection aperture 31 (see FIG. 2) of the projection lens 3 from the opened state. The size X1 is set to a size so that the light receiving portion 62 does not receive the light beam projected from the light emitting portion 61. That is to say, the light beam projected from the light emitting portion 61 is inputted to the light receiving portion 62 when the lens cover 7 slides to a position where the lens cover 7 covers even a part of the projection aperture 31. For this reason, even when the lens cover 7 moves a little from the opened state, the shielding portion 7B3 of the lens cover 7 is interposed between the light emitting portion 61 and the light receiving portion 62 of the detecting section 6. Accordingly, it is detected that the lens cover 7 does not cover the projection lens 3.

A substantially mountain-shaped slope portion 7B4 having a peak 7B41 (shown in FIG. 7) substantially in the lower center of the rear surface 7B is formed in the slide direction of the lens cover 7.

As shown in FIG. 7, the slope portion 7B4 is symmetrically formed and the end part of the protruding member 234 provided in the guide block 23 abuts on the slope portion 7B4. For this reason, when the protruding member 234 is positioned at the peak 7B41 substantially in the center of the slope portion 7B4 by sliding the lens cover 7, the largest moving force is required for sliding the lens cover 7. As the protruding member 234 becomes farther from the peak 7B41, the lens cover 7 moves with a small moving force.

Accordingly, since a large moving force is required for moving the lens cover 7 from the end in a slide range, it is possible to suppress the sudden sliding of the lens cover 7 from the end in the slide range (a range of X2 shown in FIG. 5). Accordingly, it is possible to easily keep the lens cover 7 in the opened state or the closed state, thereby easily keeping the projection lens 3 in the completely exposed state and the coated state. When the lens cover 7 exceeds a half of the slide range, it is possible to reduce the moving force used for moving the lens cover 7. Accordingly, it is possible to improve the operability of the lens cover 7 and to know the slide position of the lens cover 7 by the moving force change.

The step portion 7B5 (shown in FIGS. 7 and 8) moving down from the slope portion 7B4 is formed on both sides of the slope portion 7B4. The step portion 7B5 is formed in the end of the slide range X2 of the lens cover 7. When the lens cover 7 is in the opened state or the closed state, the fore end of the protruding member 234 abutting on the slope portion 7B4 is fitted into the step portion 7B5 and abuts on the step portion 7B5. When the protruding member 234 abuts on the step portion 7B5, the biasing force by the biasing member 235 provided at one end of the protruding member 234 becomes smallest.

The protruding member 234 abuts on the step portion 7B5, thereby causing click feeling. Accordingly, it is possible to easily know that the lens cover 7 is positioned at the end of the slide moving range. The fore end of the protruding member 234 is fitted into the step portion 7B5, whereby the sliding of the lens cover 7 is suppressed. Accordingly, it is possible to keep the lens cover 7 positioned at the end of the slide range, that is, in the state where the projection aperture 31 of the projection lens 3 is completely exposed and completely covered.

6. Configuration of Control Unit 5

Figure 9:
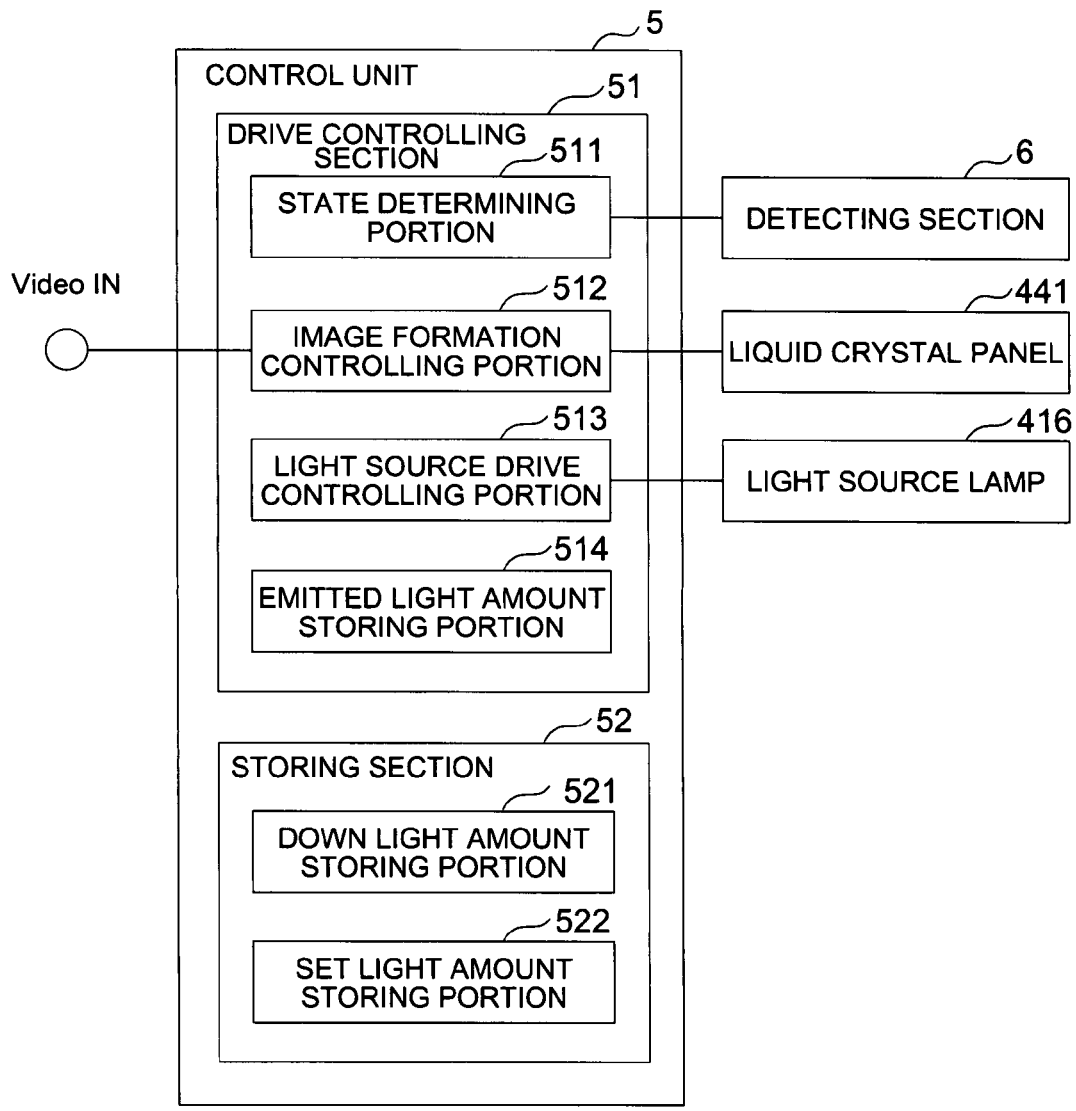
FIG. 9 is a block diagram illustrating a configuration of a control unit according to an embodiment of the invention.

FIG. 9 is a block diagram illustrating the configuration of a control unit 5.

The control unit 5 controls the driving operation of the entire projector 1 on the basis of the operation of a key provided on the operation panel 21A1 (shown in FIGS. 2 and 3) or autonomously. The control unit 5 not specifically shown is formed of a circuit substrate where a CPU (Central Processing Unit), etc. is mounted. As shown in FIG. 9, the control unit 5 includes a drive controlling section 51 and a storing section 52.

The storing section 52 is formed of a flash memory, etc. and stores various data required for driving the projector 1. A down light amount storing portion 521 and a set light amount storing portion 522 are provided in the storing section 52.

The down light amount storing portion 521 stores the amount of light emitted from the light source lamp 416 reduced by a light source drive controlling portion 513 of the drive controlling section 51 when the lens cover 7 is in the closed state.

The set light amount storing portion 522 stores the amount of light emitted from the light source lamp 416 at the time of the general driving operation of the light source lamp 416. The set light amount storing portion 522 stores the amount of light emitted from the light source lamp 416 at the time when the lens cover 7 is in the opened state by an emitted light amount storing portion 514 of the drive controlling section 51 when the lens cover 7 is switched from the opened state to the closed state.

The drive controlling section 51 controls the driving operation of the liquid crystal panel 441 and the lighting operation of the light source lamp 416 according to the state of the lens cover 7. The drive controlling section 51 includes a state determining portion 511, an image formation controlling portion 512, a light source drive controlling portion 513, and an emitted light amount storing portion 514.

The state determining portion 511 is electrically connected to the detecting section 6 and determines the opened state and closed state of the lens cover 7 on the basis of a signal inputted from the detecting section 6. More specifically, the state determining portion 511 determines that the lens cover 7 is in the opened state when an 'on' signal is inputted from the detecting section 6 and determines that the lens cover 7 is in the closed state when an 'off' signal is inputted from the detecting section 6.

The image formation controlling portion 512 controls the driving operation of the liquid crystal panel 441 depending on the state of the lens cover 7 by the state determining portion 511.

More specifically, the image formation controlling portion 512 processes inputted image information and controls the driving operation of the liquid crystal panel 441 depending on the image information so as to form the image on the basis of the image information when the state determining portion 511 determines that the lens cover 7 is in the opened state.

Meanwhile, when the state determining portion 511 determines that the lens cover 7 is in the closed state, the image formation controlling portion 512 controls the driving operation of the liquid crystal panel 441 to form a black image. Accordingly, the light beam as the black image is radiated to the lens cover 7 when the lens cover 7 is in the closed state. Therefore, the light amount of the light beam as the image radiated to the lens cover 7 decreases in comparison with the light amount of the light beam as the image based on the inputted image information, thereby suppressing the heat generation of the lens cover 7.

The light source drive controlling portion 513 controls the lighting operation and the amount of light emitted from the light source lamp.

More specifically, the light source drive controlling portion 513 lights up the light source lamp 416 in the emitted light amount set by the user, which is stored in the set light amount storing portion 522 of the storing section 52 by the emitted light amount storing portion 514 at the time of the general driving operation when the state determining portion 511 determines that the lens cover 7 is in the opened state.

Meanwhile, the light source drive controlling portion 513 lights up the light source lamp 416 in the emitted light amount smaller than the emitted light amount stored in the down light amount storing portion 521 of the storing section 52 at the time of the general driving operation when it is determined that the lens cover 7 is in the closed state.

The emitted light amount storing portion 514 stores the emitted light amount at the time when the lens cover 7 is in the opened state in the set light amount storing portion 522 of the storing section 52.

More specifically, the emitted light amount storing portion 514 stores the emitted light amount set by the user, etc. at the time of the general driving operation. The emitted light amount storing portion 514 stores the amount of light emitted from the light source lamp 416 in the opened state in the set light amount storing portion 522 when the state determining portion 511 determines that lens cover 7 is switched from the opened state to the closed state.

7. Process S in State Switching

Figure 10:
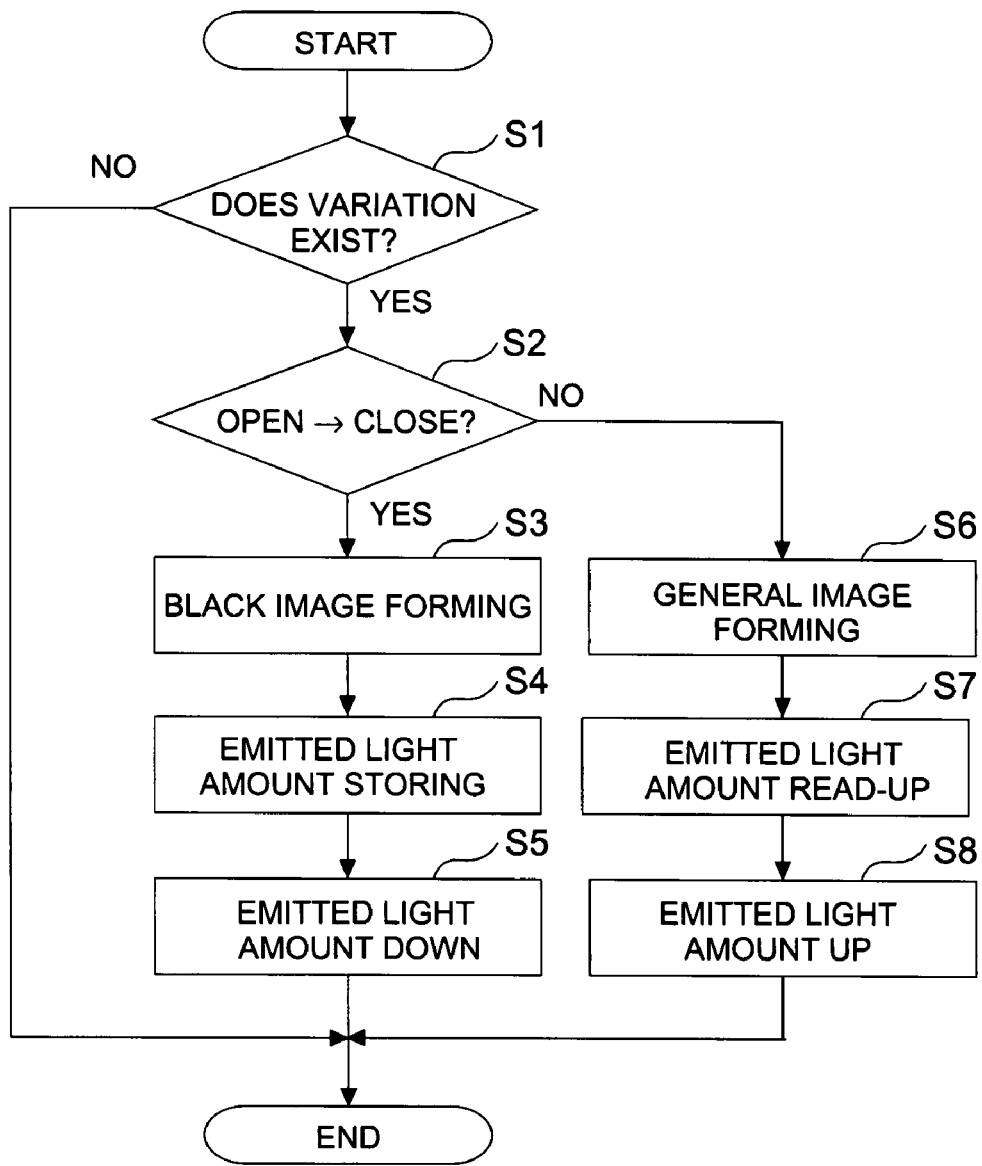
FIG. 10 is a flowchart illustrating a process flow of a process at the time of a state switching operation according to an embodiment of the invention.

FIG. 10 illustrates a process flow of a process S in state switching.

The control unit 5 executes the process S in the state switching so as to perform the process in response to the state of the lens cover 7 by detecting the corresponding state of the lens cover 7 at the time of the operation of the projector 1.

As shown in FIG. 10, the state determining portion 511 constituting the drive controlling section 51 of the control unit 5 determines whether or not the state of the lens cover 7 is changed on the basis of a signal inputted from the detecting section 6 in a process S at the time of the state switching operation (Step S1).

Herein, the state determining portion 511 monitors the state of the lens cover 7 by continuously acquiring the signal inputted from the detecting section 6 when determining that the state of the lens cover 7 is not changed.

Meanwhile, the state determining portion 511 determines whether or not the lens cover 7 is switched from the opened state to the closed state when determining that the state of the lens cover 7 is changed (Step S2).

Herein, when the state determining portion 511 determines that the lens cover 7 is switched from the opened state to the opened state, the image formation controlling portion 512 forms the black image by controlling the driving operation of the liquid crystal panel 441 (Step S3). Since at least a part of the formed black image is radiated to the lens cover 7 via the projection lens 3, it is possible to further suppress the heat generation of the lens cover 7 in comparison with the case that the light beam as the image formed at the time of the general driving operation is radiated to the lens cover 7. Accordingly, it is possible to suppress the transformation of the lens cover 7.

The emitted light amount storing portion 514 stores the amount of light emitted from the light source lamp 416 in the opened state before the lens cover 7 is switched to the closed state in the set light amount storing portion 522 of the storing section (Step S4).

Then, the light source drive controlling portion 513 lights up the light source lamp 416 in an emitted light amount smaller than the emitted light amount at the time of the general driving operation, which is stored in the down light amount storing portion 521 of the storing section 52 (Step S5). Accordingly, since the light amount of the light beam projected from the projection lens 3 is decreased, the heat generation of the lens cover 7 to which at least a part of the light beam is radiated is suppressed, thereby further suppressing the transformation of the lens cover 7.

Meanwhile, in Step S2, when the state determining portion 511 determines that the lens cover 7 is not switched from the opened state to the closed state, that is, when determining that the lens cover 7 is switched from the closed state to the opened state, the image formation controlling portion 512 stops forming the black image and performs the forming operation of the general image based on the inputted image information (Step S6). Accordingly, the light beam as the formed general image is projected from the exposed projection lens 3, whereby it is possible to easily restore the formed image to an image based on the image information.

The light source drive controlling portion 513 reads up the emitted light amount stored in the set light amount storing portion 522 of the storing section 52 (Step S7) and lights up the light source lamp 416 by setting the emitted light amount of the light source lamp 416 to the emitted light amount (Step S8). Accordingly, it is possible to restore the light amount of the light beam projected from the light source lamp 416 to the light amount before the lens cover 7 is in the closed state. Therefore, it is possible to easily restore the amount of light emitted from the light source lamp 416 to the light amount at the time of the general driving operation of the projector 1.

In the projector 1 according to this embodiment described above, it is possible to obtain the following effects.

That is, the shielding portion 7B3 of the lens cover 7 provided in the upper case 21 is interposed between the light emitting portion 61 and the light receiving portion 62 of the detecting section 6 provided in the guide block 23 and shields the light beam inputted to the light receiving portion 62 with the slide movement of the lens cover 7. The shielding portion 7B3 has a width size so as to shield the light beam inputted to the light receiving portion 62 until a state where a part of the projection aperture 31 is covered with the lens cover 7 from a state where the projection aperture 31 is completely exposed.

Accordingly, when the lens cover 7 slides so as not to cover the projection aperture 31, the shielding portion 7B3 shields the light beam inputted to the light receiving portion 62. Therefore, it is possible to allow the lens cover 7 to slide so that the projection lens 3 has no effect on the projection of the light image. Meanwhile, when the lens cover 7 slides to a position where at least a part of the projection aperture 31 is covered with the lens cover 7, the shielding portion 7B3 is not interposed between the light emitting portion 61 and the light receiving portion 62. Accordingly, since the light beam projected from the light emitting portion 61 is inputted to the light receiving portion 62, it is possible to detect that the lens cover 7 is in the closed state. Accordingly, it is possible to properly detect the opened state or the closed state of the lens cover 7.

The detecting section 6 is formed of the light emitting portion 61 and the photo interrupter having the light receiving portion 62 receiving the light beam projected from the light emitting portion 61 and detects the opened state or the closed state of the lens cover 7 by considering whether or not the light receiving portion 62 receives the light beam. Accordingly, the detecting section such as a micro switch is mechanically pressed or released with the slide movement of the lens cover 7. Therefore, it is possible to prevent a false detection in comparison with the detecting section for detecting the opened state or the closed state of the lens cover 7. Therefore, it is possible to improve the detection accuracy of the opened state or the closed state of the lens cover 7.

8. Modification of Embodiment

Best configurations for implementing the invention is described above, but the invention is not limited to the configurations. That is, specific embodiments are mainly shown and described in the invention. However, the skilled person can modify the shape, material, quantity, and other detailed configurations in the embodiments described above without departing from the technical idea and the scope of the advantage of the invention.

Accordingly, the description limited to the shape, the material, and the like described above is illustratively made for the purpose of aiding the understanding of the invention easier. Since the invention is not limited to the shape, the material, and the like described above, the description of the names of the members other than a part or the entirety limited to the shape, the material, and the like is involved in the invention.

In the embodiment, when the lens cover 7 is in the opened state, the shielding portion 7B3 of the lens cover 7 shields the light beam projected from the light emitting portion 61 of the detecting section 6 and inputted to the light receiving portion 62, but the invention is not limited to the configuration. For example, when the lens cover 7 is in the closed state, the shielding portion 7B3 of the lens cover 7 may shield the light beam inputted to the light receiving portion 62.

In the embodiment, the light emitting portion 61 and the light receiving portion 62 of the detecting section 6 are opposed to each other in a direction substantially orthogonal to the slide direction of the lens cover 7, but the invention is not limited the configuration. That is, the light emitting portion 61 and the light receiving portion 62 may be formed or disposed in a position where the movement locus of the shielding portion 7B3 of the lens cover 7 intersects with the optical path of the light beam projected from the light emitting portion 61 and inputted to the light receiving portion 62. For example, the light emitting portion 61 and the light receiving portion 62 may be disposed in a position inclined to the slide direction.

In the embodiment, the detecting section 6 having the light emitting portion 61 and the light receiving portion 62 to which the light beam projected from the light emitting portion 61 is directly inputted is adopted as the detecting section, but there may be used the detecting section having the configuration in which the light beam projected from the light emitting portion is reflected on a predetermined surface and is inputted to the light receiving portion.

In the embodiment, the state where at least a part of the projection aperture 31 of the projection lens 3 is covered with the lens cover 7 represents the closed state of the lens cover 7 and the state where the projection aperture 31 is completely exposed represents the opened state of the lens cover 7, but the invention is not limited to the configuration. For example, the state where the projection aperture 31 is completely covered may represent the closed state and at least a part of the projection aperture 31 is exposed may represent the opened state.

In the embodiment, the slope portion 7B4 formed in the lens cover 7 has the peak 7B41 on the upper side thereof and has the substantially mount shape, but the slope portion 7B4 may have an upside-down shape contrary to the shape. In this case, the protruding member and the biasing member provided in the guide block 23 abut on the slope portion while the protruding member urges upwardly.

In the embodiment, when the lens cover 7 is switched from the opened state to the closed state, the amount of light emitted from the light source lamp 416 is decreased due to the formation of the black image, but when the lens cover 7 is not switched to the opened state within a predetermined time after the lens cover 7 is in the closed state, the light source lamp 416 may be lighted out. Accordingly, when the lens cover 7 is left closed, the light source lamp 416 is automatically lighted out. Therefore, it is possible to suppress useless power consumption. Then, when the image formation on the liquid crystal panel 441 is also stopped, it is possible to suppress the useless power consumption and to prevent burn-in from occurring on the liquid crystal panel 441.

In the embodiment, the optical unit 4 has the substantially L shape in the plan view, but the invention is not limited to the configuration and for example, the optical unit 4 may have a substantially U shape in the plan view.

In the embodiment, there has been used the penetration-type liquid crystal panel 441 where the incident surface and the projection surface of the light beam are different from each other, but there may be used a reflection-type liquid crystal panel where the light incident surface and the light projection surface are identical to each other.

In the projector 1 according to the embodiment, three liquid crystal panels 441R, 441G, and 441B have been used, but the invention is not limited to the configuration.

That is, the invention can be applied to a projector in which two or four or more liquid crystal panels are used.

In the embodiment, the projector 1 having the liquid crystal panel 441 as the light modulating device is exemplified, but there may be adopted light modulating devices having different configurations as long as light modulating devices form the light image by modulating the inputted light beam in response to the image information. For example, the invention can also be applied to a projector in which the light modulating device other than a liquid crystal layer, such as a device in which a micro mirror is used. The polarization plates 442 and 444 on the light beam incident side and the light beam emitting side may be omitted when such a light modulating device is used.

The invention can be used for a projector and more particularly, properly used for a projector which is provided with a light source having a large emitted light amount.

The entire disclosure of Japanese Patent Application No. 2006-058645, filed Mar. 3, 2006 is expressly incorporated by reference herein.

What is claimed is:

1. A projector comprising:
a light source;
a light modulating device that forms a light image by modulating a light beam projected from the light source in response to image information;
a projection lens that projects the formed light image; and
a chassis that houses the light source, the light modulating device, and the projection lens therein, wherein
the chassis including
a lens cover which is provided to be slidable relative to the chassis and which covers a projection aperture of the projection lens by sliding in one direction and exposing the projection aperture by sliding in the opposite direction,
a detecting section including a light emitting portion which projects the light beam, and a light receiving portion that receives the light beam projected from the light emitting portion,
the detecting section detects the opened state or the closed state of the lens cover depending on the absence or presence of the light beam received by the light receiving portion, and the light emitting portion and the light receiving portion are disposed so that the optical path of the light beam projected from the light emitting portion and inputted to the light receiving portion intersects a slide direction of the lens cover, and
a light shielding portion shielding the light beam inputted from the light emitting portion to the light receiving portion is provided in the lens cover, and the light shielding portion is formed in a predetermined width in the slide direction of the lens cover.

2. The projector according to claim 1, further comprising:
a state determining portion which is connected to the detecting section and which determines the opened state or the closed state of the lens cover by acquiring the opened state or the closed state of the lens cover from the detecting section; and
an image formation controlling portion which forms a black image in the light modulating device when the state determining portion determines that the lens cover is in the closed state.

3. The projector according to claim 2, wherein
the image formation controlling portion forms a light image based on image information in the light modulating device when the state determining portion determines that the lens cover is switched from the closed state to the opened state.

4. The projector according to claim 1, further comprising:
a state determining portion which is connected to the detecting section and which determines the opened state or the closed state of the lens cover by acquiring the opened state or the closed state of the lens cover from the detecting section; and
a light source drive controlling portion which reduces the amount of light emitted from the light source when the state determining portion determines that the lens cover is in the closed state.

5. The projector according to claim 4, further comprising:
a storing section that stores the amount of light emitted from the light source; and
an emitted light amount storing portion that stores the amount of light emitted from the light source when the lens cover is in the opened state, wherein
the light source drive controlling portion lights up the light source in the amount of light stored in the storing section by the emitted light amount storing portion when the state determining portion determines that the lens cover is switched from the closed state to the opened state.

6. The projector according to claim 1, further comprising:
a protruding member abutting on the lens cover and an biasing member biasing the protruding member in one direction relative to the lens cover are provided on a surface of the chassis opposed to the lens cover; and
a slope portions which abut on the protruding member and are symmetrical about substantially the center of a slide range of the lens cover are provided along the slide direction of the lens cover, wherein
the slope portions move the protruding member in a direction where an biasing force increases by the biasing member by positioning the protruding member in the center of the slide range with the sliding operation of the lens cover.

7. The projector according to claim 6, wherein
a step portion into which the protruding member is fitted is provided on both sides of the slope portion.

* * * * *